United States Patent [19]

Uehara et al.

[11] Patent Number: 5,761,274

[45] Date of Patent: Jun. 2, 1998

[54] METHOD FOR REGURATING CALL CONGESTION AND ISDN EXCHANGER FOR PERFORMING THE SAME

[75] Inventors: Takeshi Uehara; Mamoru Gotoh, both of Tachikawa, Japan

[73] Assignee: Fujitsu Limited, Kanagawa, Japan

[21] Appl. No.: 490,135

[22] Filed: Jun. 14, 1995

[30] Foreign Application Priority Data

Sep. 8, 1994 [JP] Japan ................................. 6-214558

[51] Int. Cl.$^6$ ............................................. H04M 1/64

[52] U.S. Cl. ........................... 379/88; 379/134; 370/230; 370/522

[58] Field of Search ........................ 370/110.1, 60, 370/229–235, 237, 522; 379/111, 134, 140, 67, 88

[56] References Cited

U.S. PATENT DOCUMENTS 5,283,788  2/1994  Morita et al. ........................ 379/111
5,357,504  10/1994  Siegmund ............................ 370/110.1
5,398,246  3/1995  Fujioka ............................... 370/110.1

FOREIGN PATENT DOCUMENTS 1-248741  10/1989  Japan.
3-201854  9/1991  Japan.
3-280766  12/1991  Japan.
4-16095  2/1992  Japan.

Primary Examiner—Fan S. Tsang
Attorney, Agent, or Firm—Helfgott & Karas, P C

[57] ABSTRACT

An ISDN exchanger can reduce processing of layer 3 on layer 2 processing to the utmost, and control call congestion with only the layer 2 processing, practically. The ISDN exchanger for regulating call congestion includes a call processing means for processing a call control data or message in an ISDN system as internal processing and a regulating means provided at the previous stage of the call processing means for judging whether or not the number of receiving calls exceeds a prescribed value, and regulating call set up requests without the internal processing when the number of received call set up requests exceeds the prescribed value.

11 Claims, 22 Drawing Sheets

METHOD FOR REGURATING CALL CONGESTION AND ISDN EXCHANGER FOR PERFORMING THE SAME

BACKGROUND OF THE INVENTION

1. Field of the Invention

The present invention relates to an ISDN exchanger. More particularly, it relates to an ISDN exchanger having a function of regulating call congestion.

2. Description of the Related Art

In recent years, it has been spreading to introduce Private Branch Exchangers (PBX: ISPBX), by which ISDN service can be received to a large number of companies.

When the PBXs are connected to ISDN public networks, interfaces on the side of PBX offices follow to layer 1 (I430/431), layer 2 (Q921), and layer 3 (Q931) of the ITU-T Recommendation.

The layer 1 prescribes a method for transmitting electric signals on ISDN user network interfaces, wiring forms, a physical starting procedure on an initialization between terminal equipment (TE) and network terminals (NT), etc.

The layer 2 called as a Link Access Procedure for D channel has a function for transmitting information between users and networks with high speed by employing a bit stream, which means a frame, as one unit, with no error.

The layer 3 has functions of setting, releasing, and regulating calls including additional service. A large part of the functions is commonly applied on a basic interface and a primary group interface.

FIG. 19 is a diagram for explaining problems on a conventional system where a PBX is connected to an office switch. In FIG. 19, an ISDN private branch exchanger (PBX) 1 and an office switch 2 are connected by 71 dial-in (DI) lines as an example. The PBX 1 has five extension lines (IC).

Accordingly, the office switch 2 receives only 71 dial in (DI) lines, when calls are congested, for example, 1500 calls are received from outside lines (OC) per a minute. The other calls are regulated due to a processing performed when lines are busy (Hereinafter, it is referred as to a busy call processing).

Further, in the PBX 1, only the 5 extension lines that are selected from the 71 lines received in the office switch 2 can be accepted. The refused lines other than the selected 5 extension lines are subject to the busy call processing.

When the PBX 1 completes the busy call processing and the lines become idle, calls are received again and the PBX 1 repeats to perform the busy call processing for the incoming calls. Therefore, a rate of using a controller (CC) in the PBX 1 increases. Thus, it brings obstacles, such as to delay dial tones of other extension lines, disable to receive calls from the office switch, and disable to enter maintenance operation commands.

FIG. 20 is a diagram for explaining a structure of a general PBX 1. FIG. 21 is a diagram for explaining a busy call processing when the calls are congested, as explained in FIG. 19, with the structure shown in FIG. 20. Further, FIG. 22 illustrates a signal sequence of the conventional system that performs the busy call processing when the calls are congested.

In FIG. 20, reference numeral "80" shows a plurality of lines, that are received in the office switch 2, shown as the 71 dial-in (DI) lines in FIG. 19.

Reference numerals "81" and "82" are a network section (NW) including a line controller 811 and a call controller (CC), respectively. The call controller 82 includes an Execution Control Processor (EP) 821, a Call Processor (CP) 822 which performs an internal processing, and an Administration Processor (AP) 823.

The internal call processor 822 of the PBX 1 performs a busy call processing for all calls. FIG. 21 is a diagram for explaining the call processing in the PBX 1.

In the conventional ISDN exchanger, the line controller 811 in the network section (NW) 81 receives a waiting queue 801 (refer to FIG. 21) of the layer 2, that is, data link layer, from the lines 80.

The line controller 811 performs a message analyzation for inter-layers communication between the line controller 811 and the call controller 82. Then, the message is sent to the call controller 82 which is a processor of the layer 3, and is processed in the input processor 824. Normalization of parameters for an internal processing according to the layer 3 message is executed in the input processor 824. The processing in the input processor 824 requires approximately 100 ms.

After then, the message is led to the internal call processor 822 to perform an internal analyzation and a busy call processing. After processing in the internal call processor 822, the processing in an output processor 825 is performed. The output processor 825 edits the layer 3 message according to internal formed parameters. The processing in the output processor 825 also requires approximately 100 ms.

An output is sent from the call controller 82 to the line controller 811 to construct a message based on the inter-layers communication.

FIG. 22 shows a sequence of signals in the above-described processing. The sequence of signals shown in FIG. 22 follows the ITU-T recommendation Q931 (ISDN layer 3).

At first, the normalization of parameters is performed in the input processor 824 according to the layer 3 message for internal processing, when a call set up (SET UP) request is sent from the lines 80 to the call controller 82 via the line controller 811. The processing in the input processor 824 requires approximately 100 ms.

Then, the call processing request is sent to the internal call processor 822 in the call controller 82 to perform a processing of accepting calls as an internal processing. The processing of accepting calls requires approximately 100 ms.

Further, if the call request can be accepted to set, the call reception processing is performed, and calls are processed in the output processor 825 and returned to the lines 80. The call reception processing requires approximately 100 ms.

Meanwhile, if the call request is refused to set, the busy call processing is performed as internal processing. The busy call processing requires approximately 200 ms. Then, the disconnection of lines is performed. The disconnection processing requires approximately 100 ms.

In this way, the conventional ISDN PBX 1 has a structure in which the call processing for all calls are took into the call processor 82. Accordingly, the call signals increase in the queue 801 for the layer 2 processing in the call controller 82 which is a processor of the layer 3, that is, network layer, at the time of call congestion.

The perfect signal processing requires a large number of queues for processing layer 2. However, there is a physical limit to a length of queuing for processing the layer 2. Therefore, when the length of queuing for processing the layer 2 reaches a prescribed length, the layer 2 processor sends a RNR (Receive Not Ready) signal to a call sender and suspends to receive calls from the sender, that is, the office switch 2 in the example of FIG. 19.

If the layer 2 processor sends the RNR signal and suspends to receive the calls from the sender, the sender temporally disconnects the data link of the layer 2, so that the layer 2 is disconnected. Further, because the processing of the layer 3 which performs as internal processing is performed from initialization, the exchange processing is disconnected temporally.

Furthermore, as described above, the busy call processing is performed as internal processing. If one call processing request is made subject to the busy call processing, the processing requires approximately 500 ms. Therefore, that brings increase of processing time as the calls are congested.

SUMMARY OF THE INVENTION

Accordingly, it is an object of the present invention to provide an ISDN exchanger in which regulation for call congestion is performed to overcome inconvenience, such that calls are disconnected on the layer 3 processing with a disconnection of the layer 2 processing when call congestion occurs.

It is another object of the present invention to provide an ISDN exchanger in which the layer 2 processing does not depend on the layer 3 as much as possible, and it becomes possible to relax the call congestion with only the layer 2 processing.

It is still another object of the present invention to provide an ISDN exchanger in which regulation for call congestion is performed without extending a length of queuing for processing layer 2 or adding new messages of layer 3.

It is a further object of the present invention to provide an ISDN exchanger in which it becomes possible to reduce the time for a busy call processing of approximately 500 ms required in the conventional system to approximately 200 ms (the input processing and the output processing require approximately 100 ms, respectively). 200 ms in the time required to perform the regulation for the reception of the call set up.

An ISDN exchanger according to the present invention has a basic structure as follows;

The ISDN exchanger includes a call processor which processes a layer 3 in an ISDN system as internal processing, and a regulating means provided at the previous stage of the call processor, which judges whether or not the number of the received calls exceeds a prescribed value, and regulates call set up requests without the internal processing when the number of calls exceeds the prescribed value.

More particularly, as a call regulating means, it is formed to employ the prescribed value as a prescribed times for receiving the call set up requests, and regulate the call reception, when the number of the call set requests exceeds the times for receiving the call set up requests.

Further, it is formed to employ the prescribed value as a prescribed rate of using the call processor, and regulate the call reception, when the number of call set up requests exceeds the rate of using the call processor.

Furthermore, it is formed to employ the prescribed value as a prescribed length of a queue, and regulate the call reception, when the number of call set requests exceeds the prescribed length of a queue.

The further objects of the present invention will become apparent from the following detailed description accompanied with drawings.

DESCRIPTION OF THE PREFERRED EMBODIMENT

Figure 1:
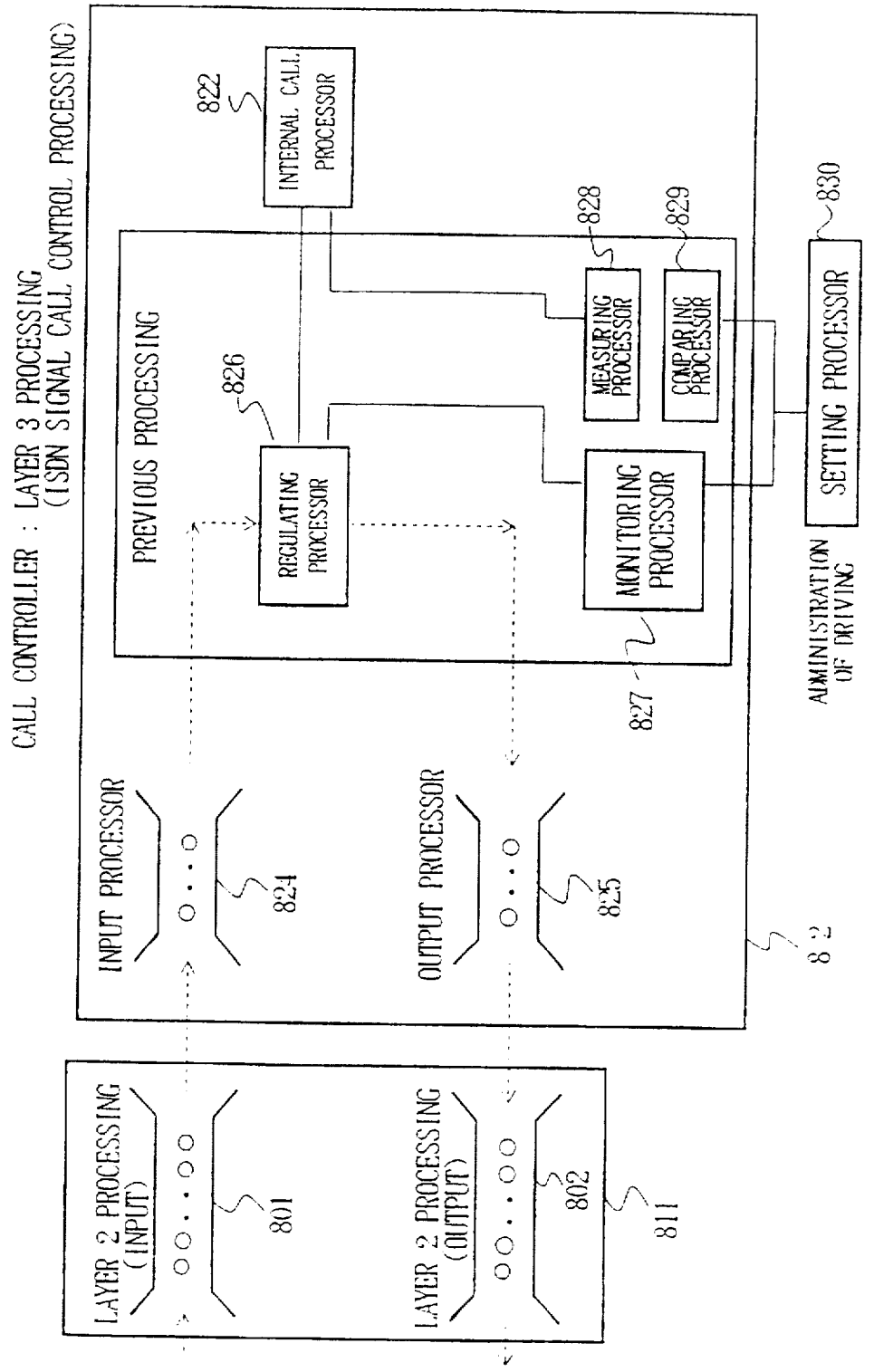
FIG. 1 is a block diagram for explaining the outline of an embodiment according to the present invention.

Throughout the following descriptions, the same reference numerals are used to denote and identify corresponding or identical components.

FIG. 1 shows a block diagram of totally explaining a call regulation processing in an ISDN exchanger according to the present invention. In comparison with the conventional system shown in FIG. 21, a regulating processor 826, a monitoring processor 827, a measuring processor 828, a comparing processor 829 and a setting processor 830 are further provided in the call controller 82 of the ISDN exchanger 1, in front of an internal call processor 822 which performs call processing as internal processing.

The setting processor 830 sets the prescribed regulation times of calls which can be received in response to call set up (SET UP) requests, as explained later as an embodiment.

The line controller 811 receives the queue 801 of the call set up (SET UP) requests in the layer 2 processing. Then, the queue 801 subsequently is input to the call controller 82 to perform the inputted processing in the input processor 824. After processing in the input processor 824, the queue is inputted to the regulating processor 826.

Before processing in the internal call processor 822 which processes the layer 3, the set number of receiving the call set up (SET UP) requests is measured by the measuring processor 828 according to calls recognized in the internal call processor 822.

The comparing processor 829 compares the set number of receiving calls measured by the measuring processor 828 and the prescribed number of calls set by the setting processor 830. The regulating processor 826 is controlled by the monitoring processor 827 based on the result of comparison in the comparing processor 829. Accordingly, the regulating processor 826 performs the regulation of call processing.

As described above, in the conventional example shown in FIG. 21, the processing of regulating calls is performed in the internal call processor 822. The exchanger according to the present invention includes a regulating processor 826, a monitoring processor 827, a measuring processor 828, a comparing processor 829 and a setting processor 830, which are provided separately from the internal call processor 822. The processing of regulating the calls is performed by the above-described processors 826, 827, 828, 829 and 830 before processing in the internal call processor 822.

Figure 21:
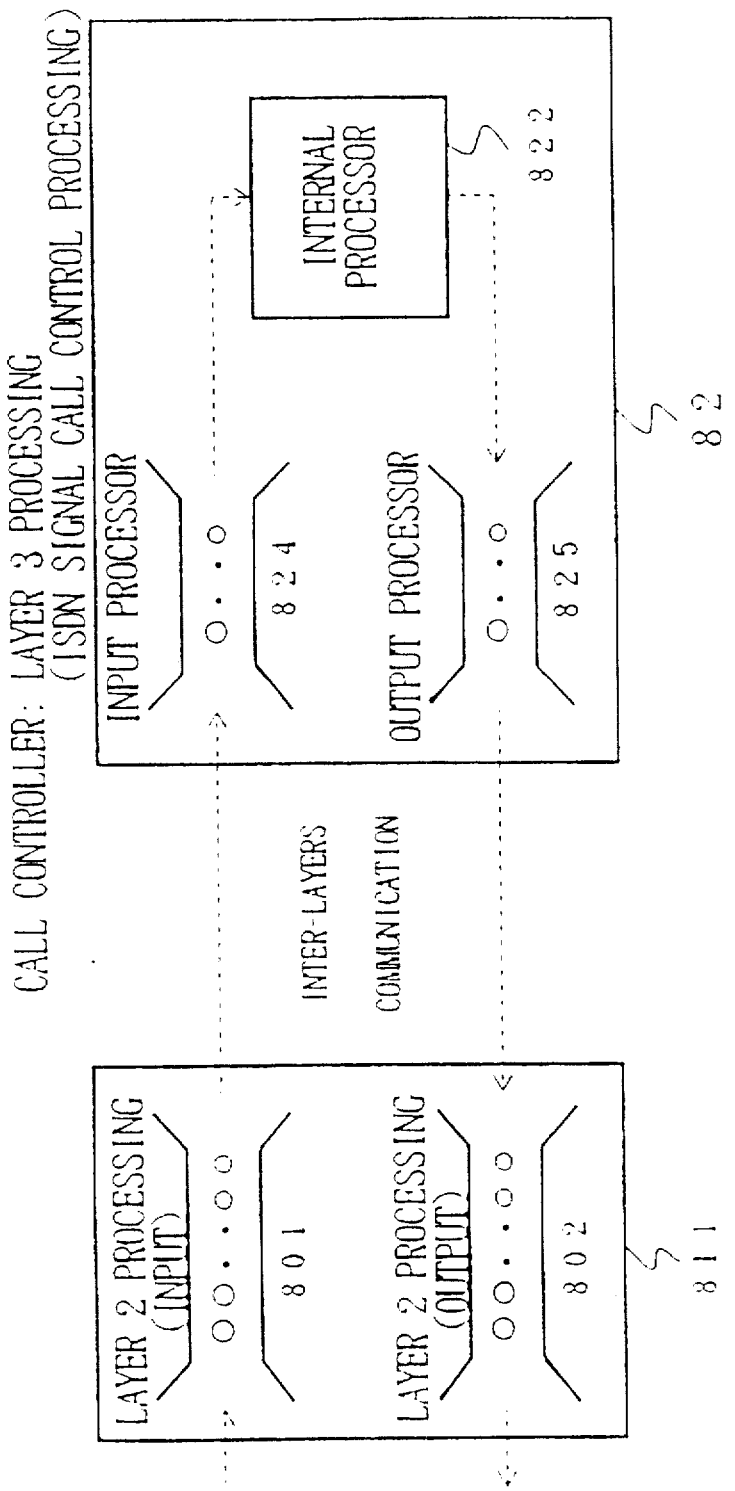
FIG. 21 is a diagram for explaining a conventional call processing in the PBX.

Further, the internal processing 822 performs the call reception processing, internal analyzation, and the busy call processing as a processing above the layer 3 in the conventional system shown in FIG. 21. However, the regulated flag processing is performed in the embodiments of the present invention.

Accordingly, it becomes possible according to the present invention to easily perform the regulation processing for call congestion in the layer 3. Further, it is not required to extend a queue for processing the layer 2 and regulate with a new message in the layer 3. Therefore, it becomes easy to regulate the all congestion in exchange processing of the ISDN system.

In the conventional system, the busy call processing required approximately 500 ms (100 ms for the input processing, 300 ms for the internal processing, and 100 ms for the output processing). On the other hand, in the present invention, the processing requires approximately 200 ms, that is a minimum limit, for only the regulation processing (100 ms for the input processing, several ms for the previous processing and 100 ms for the output processing).

Therefore, it is possible to prevent from increasing the length of the queue for processing the layer 2 and remove the cause of disconnecting the layer 2.

Figure 2:
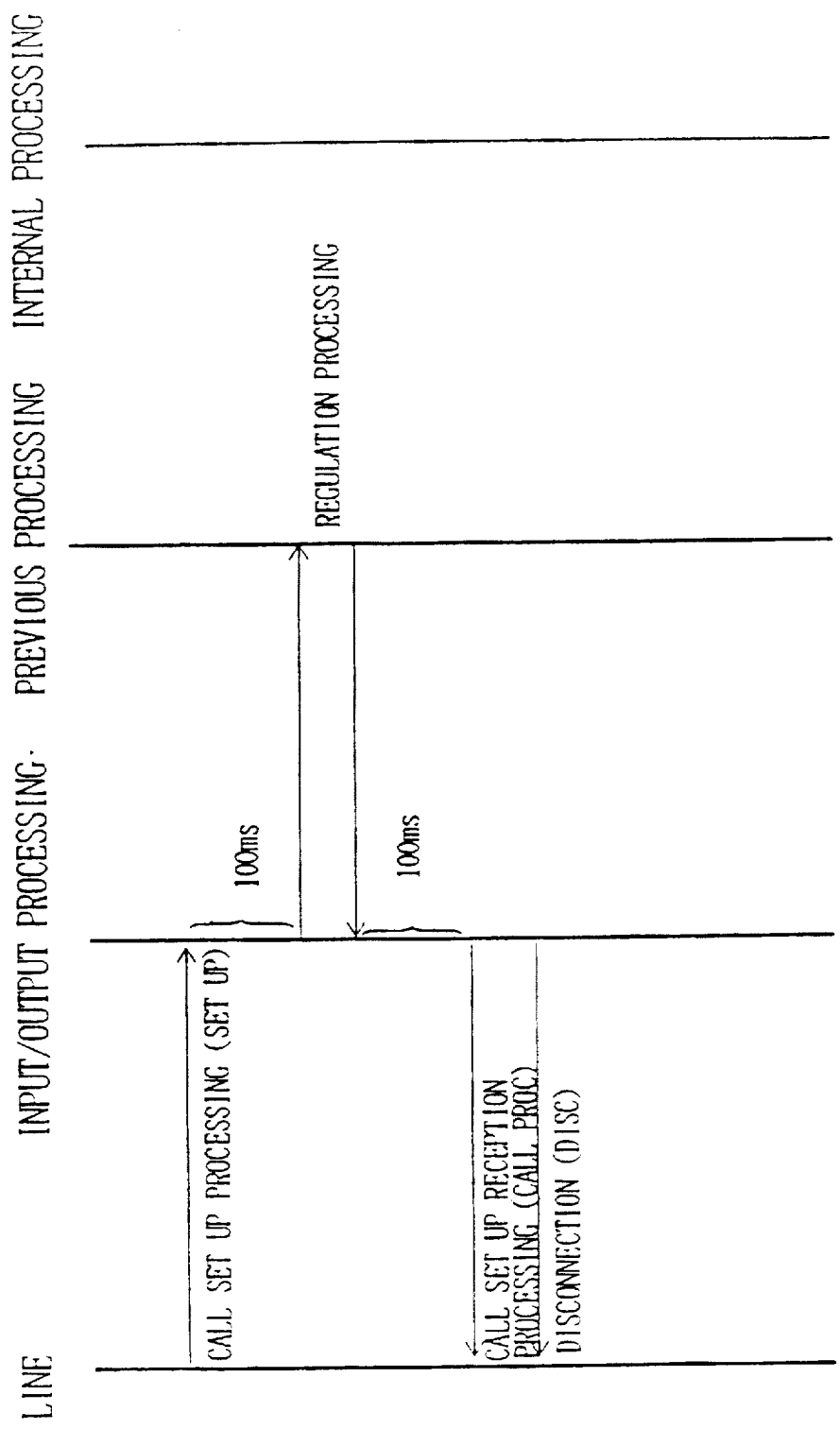
FIG. 2 is a diagram showing a signal sequence for disconnecting in according to the present invention.
Figure 3:
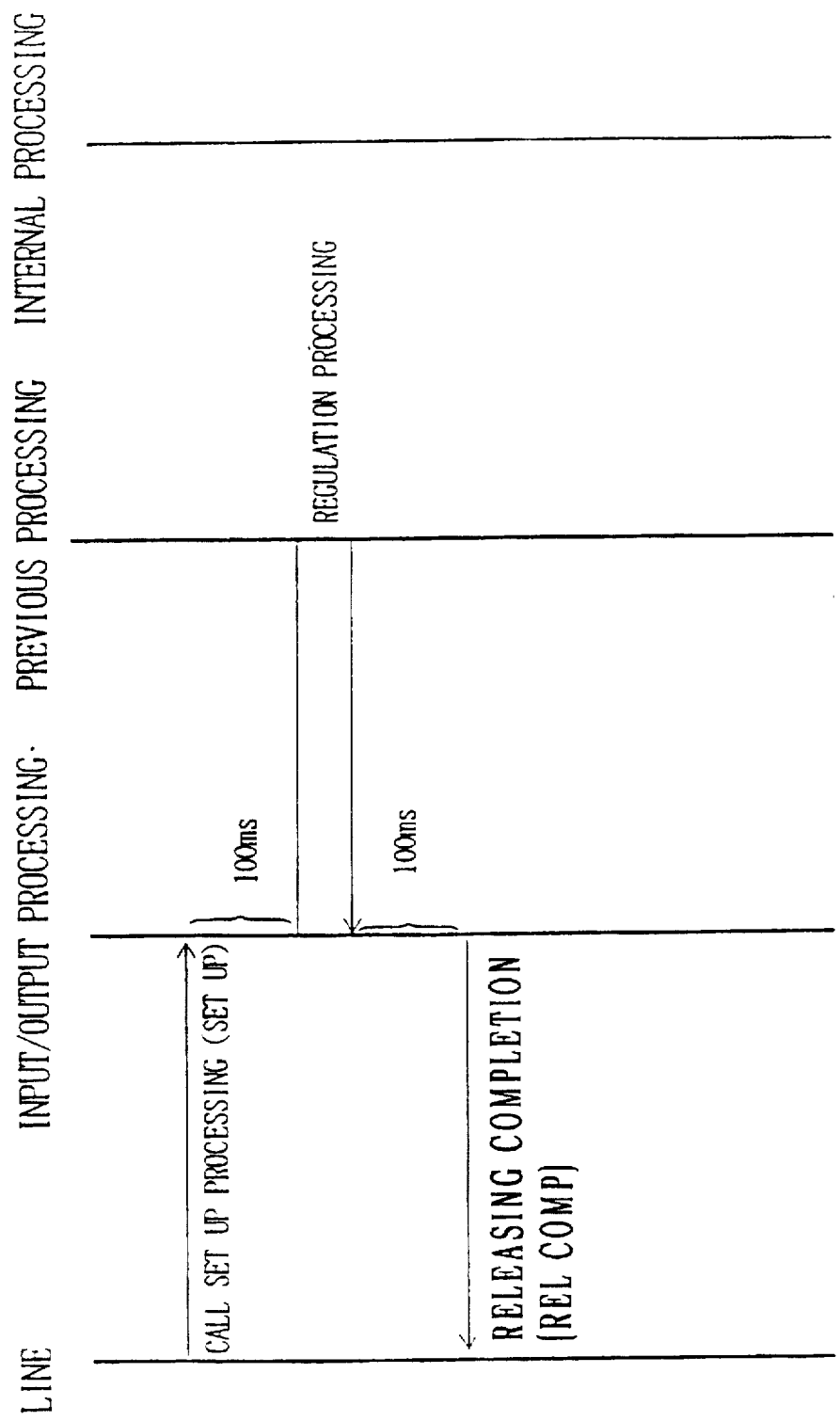
FIG. 3 is a diagram showing a signal sequence for releasing according to the present invention.
Figure 22:
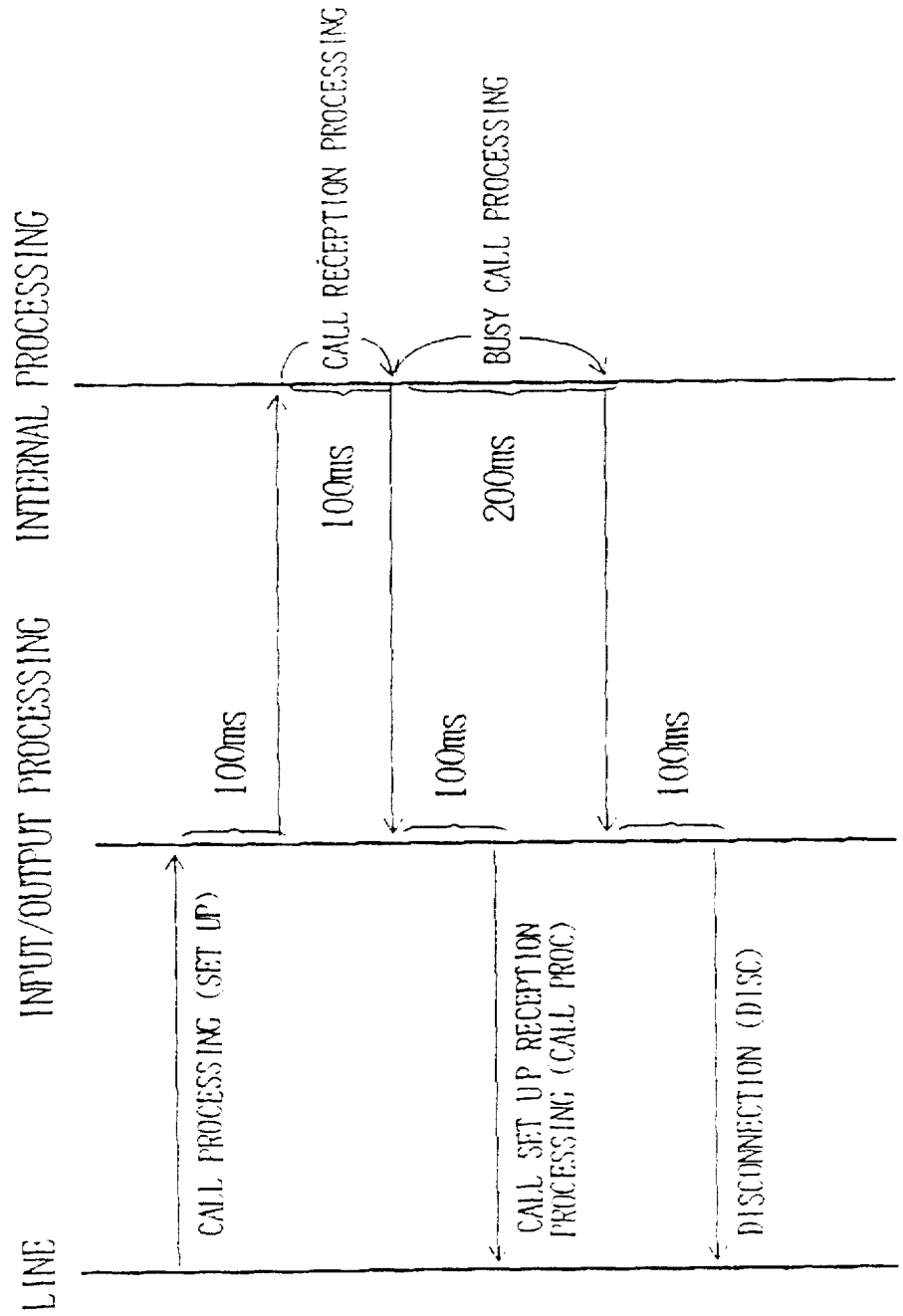
FIG. 22 is a diagram showing a signal sequence according to a conventional system.

FIGS. 2 and 3 are diagram for explaining signal sequences according to the present invention in comparison with the signal sequence in the conventional system shown in FIG. 22. FIG. 2 shows a signal sequence for disconnection. When the line controller 811 receives the call set up (SET UP) requests from the line 80, the request is sent to the call controller 82 via the line controller 811 to perform the input processing in the input processor 824. The input processing requires approximately 100 ms, as described above.

When the call regulation is performed for the call set up (SET UP) requests because of the call congestion, the regulation processing is performed by the procedure described later, as a previous processing of internal processing in the internal call processor 822 according to the present invention. That is, the reception of call set up (SET UP) requests is notified to the sender as a previous processing of internal processing without routing the busy call processing employed as internal processing to perform the disconnection.

Further, as shown in FIG. 3, the regulation processing is performed and the releasing of lines is notified to the sender, without routing the busy call processing as internal processing. In both cases, the load of the call controller 82 can be reduced because the calls are not routed to the internal processing. Furthermore, the disconnection and the releasing will be explained in accompany with sequences shown in FIGS. 2 and 3.

Figure 4:
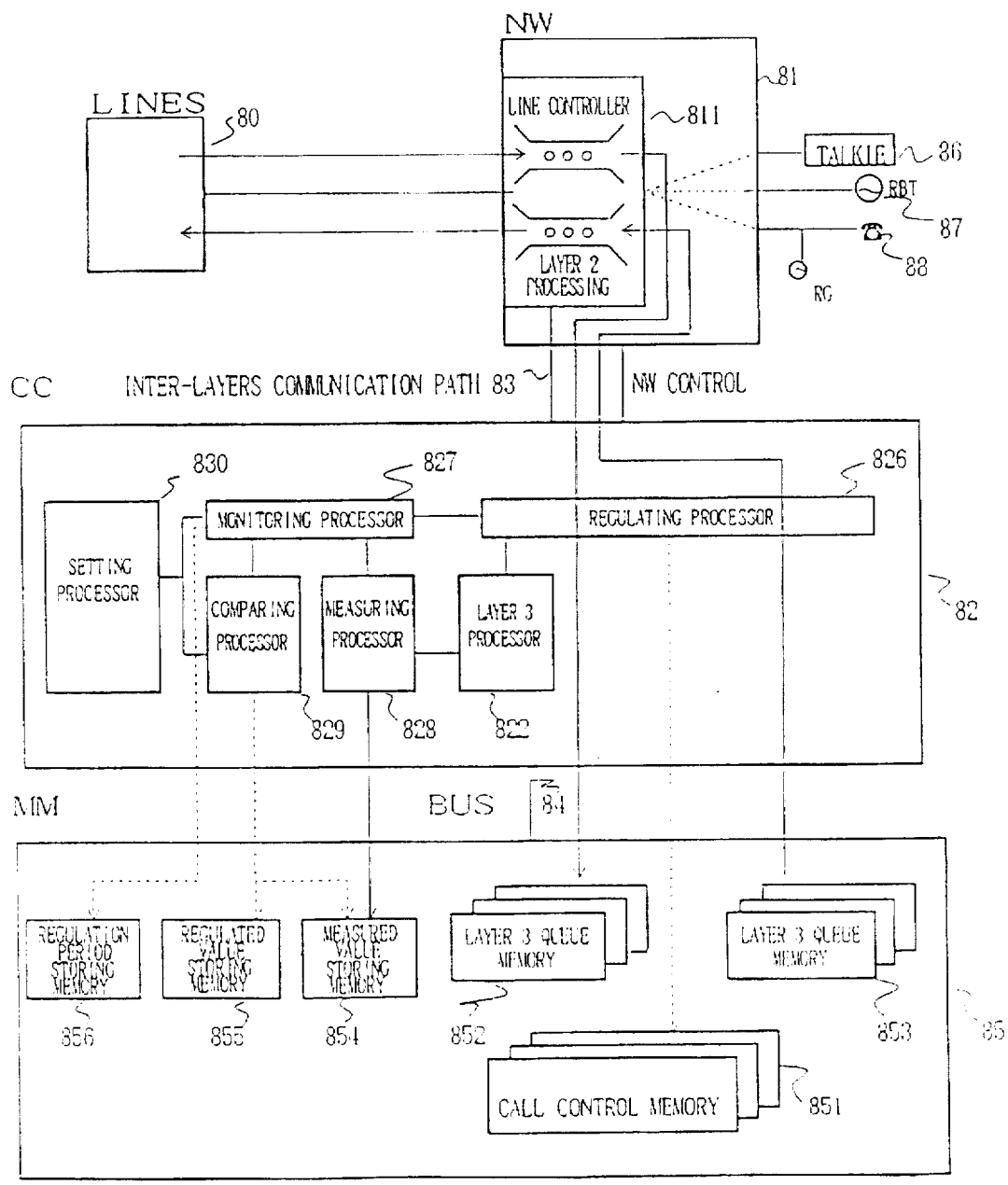
FIG. 4 is a block diagram of an embodiment according to the present invention.

FIG. 4 is a block diagram showing a structure of one embodiment of the ISDN exchanger according to the present invention corresponding to the total explanation of the call regulation processing shown in FIG. 1. In FIG. 4, the exchanger includes a network section 81, a call controller 82 and a memory 85. The call controller 82 is connected to the memory 85 with the communication bus 84.

Further, the network section 81 is connected to the call controller 82 with an inter-layers communication path 83. The network section 81 includes a line controller 811, and the ISDN lines 80 are received in the line controller 811 to perform the processing of the layer 2. A talkie 86, a ring back tone generator 87, ringer and the extension line 88 are connected to the network section 81.

Each function of sections which form the call controller 82 is realized by executing a prepared and pre-stored control program. Accordingly, the regulating processor 826, the monitoring processor 827, a measuring processor 828, a comparing processor 829 and a setting processor 830, which are additionally provided according to the present invention have hardware equipment, such as a CPU, individually, and the functions of the processors are performed by executing the control program with a common CPU.

The exchanger provides the memory 85 to execute and control the processors provided in the call controller 82 shown in FIG. 4. The memory 85 includes a call control memory 851, which stores data on the steps for executing the regulating processor 826, that is, the content of the regulation processing.

Further, in FIG. 4, a layer 3 queue memory 852 receives and stores the queue of calls processed for the layer 2 by the line controller 811 of the network section 81.

A memory 853 is to store the queue of sending calls, which are processed for the layer 3 and the call reception set up. The output of the memory 853 is sent to the line controller 811 of the network section 81 as a queue 802 (refer to FIG. 1) for sending to the ISDN lines 80.

A memory 854 stores the content measured by the measuring processor 828 according to the output of the layer 3 processor 822 as a part of internal processing including the call reception set up processing. A memory 855 stores the regulated value set by the setting processor 830.

Accordingly, the comparing processor 829 reads and compares the contents stored in each of the memory 854 storing the measured value and the memory 855 storing the regulated value. Further, a memory 856 sets and stores a regulation period. The regulation period is set by the setting processor 830 as the same as the regulated value set on the basis of the status of system congestion. After then, the regulation period is stored in the memory 856.

The monitoring processor 827 reads the output of the comparing processor 829 with the timing of regulation period stored in the memory 856, and sends a control signal to the regulating processor 826 to perform a prescribed regulation processing.

The operation illustrated in FIG. 4 will be explained according to the regulation method. The number of regulation (regulated value) and the time of regulation (regulation period) are prescribed to each of the memory 855 for storing the regulated value and the memory 856 for storing the regulation period in the memory 85 via the setting processor 830 of the controller 82 by a system operator.

Figure 5:
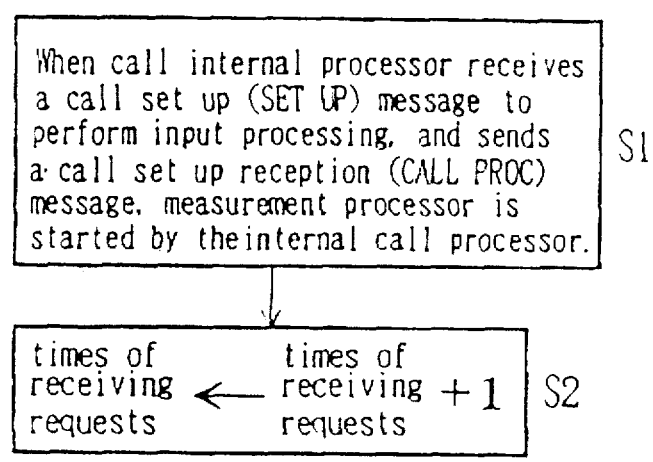
FIG. 5 is a flow chart illustrating an operation flow of a measuring processor shown in FIG. 4.

FIG. 5 shows an operation flow chart of the processing in the measuring processor 828. As shown in FIG. 5, the layer 3 processor 822 which is a part of internal processing receives a call set up (SET UP) message from the ISDN line 80 via the line controller 811 to perform the input processing. When sending the call set up reception (CALL PROC) message, the measuring processor 828 is started by the layer 3 processor 822 (STEP S1).

Then, the measuring processor 828 adds one to the times of receiving call set up requests and stores the added times of receiving call set up requests in the memory 854 of the memory 85 (STEP S2).

Figure 6:
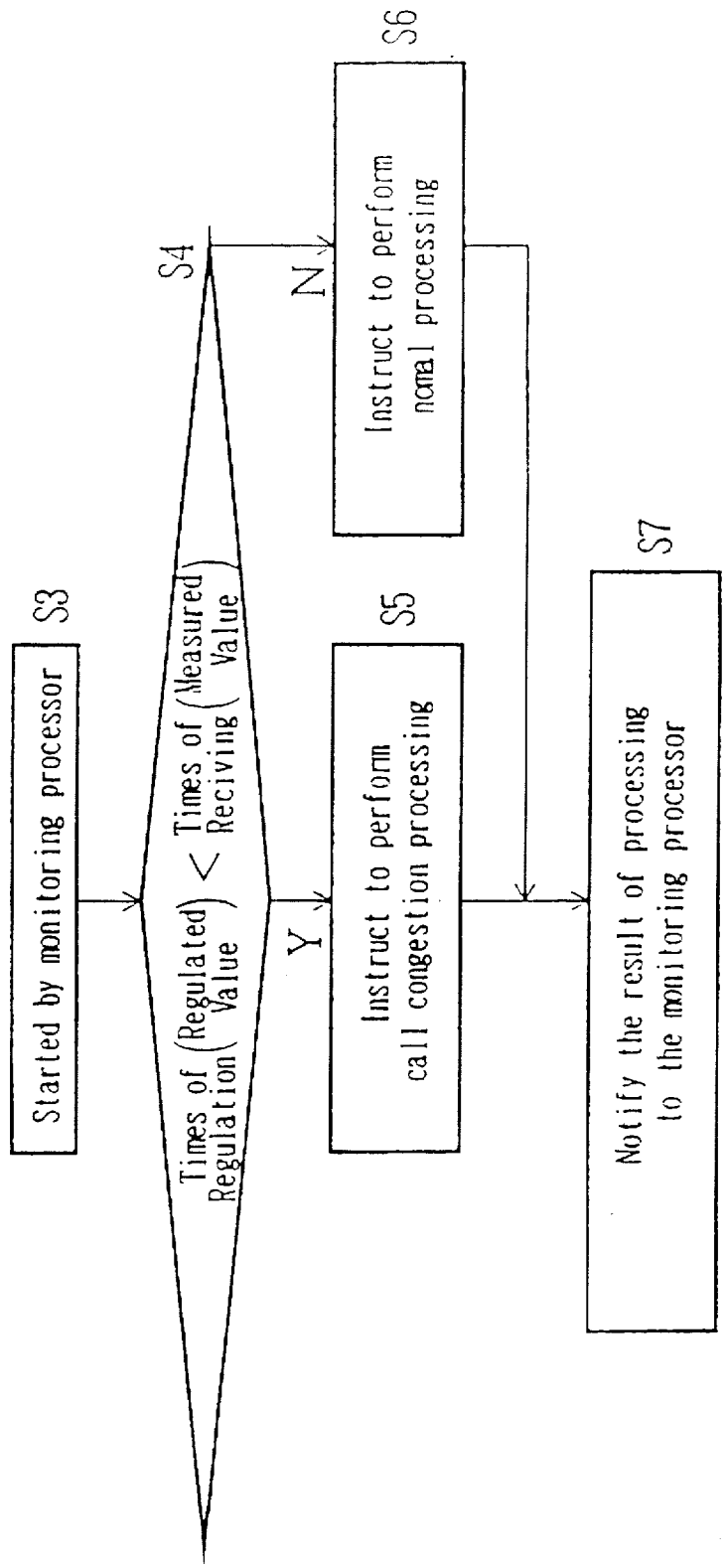
FIG. 6 is a flow chart illustrating an operation flow of a comparing processor shown in FIG. 4.

FIG. 6 shows an operation flow chart of the processing in the comparing processor 829. A monitoring means, which can be monitored by the system operator, not shown in the diagram, starts the comparing processor 829 (STEP S3). Then, the comparing processor 829 compares the regulated value stored in advance in the memory 855 of the memory 85 with the measured value added by the measuring processor 828, described above, and stored in the memory 854 of the memory 85 (STEP S4).

As the result of this comparison, the comparing processor 829 instructs the regulating processor 826 to perform the call congestion processing, in the case where the measured value is more than the regulated value (STEP S5). In the case where the measured value is less than the regulated value, the processor 829 instructs the processor 826 to perform a normal processing (STEP S6).

In both cases, the result of processing is reported to the above-described monitoring processor (STEP S7). Therefore, the system operator can monitor the call congestion status.

Figure 7:
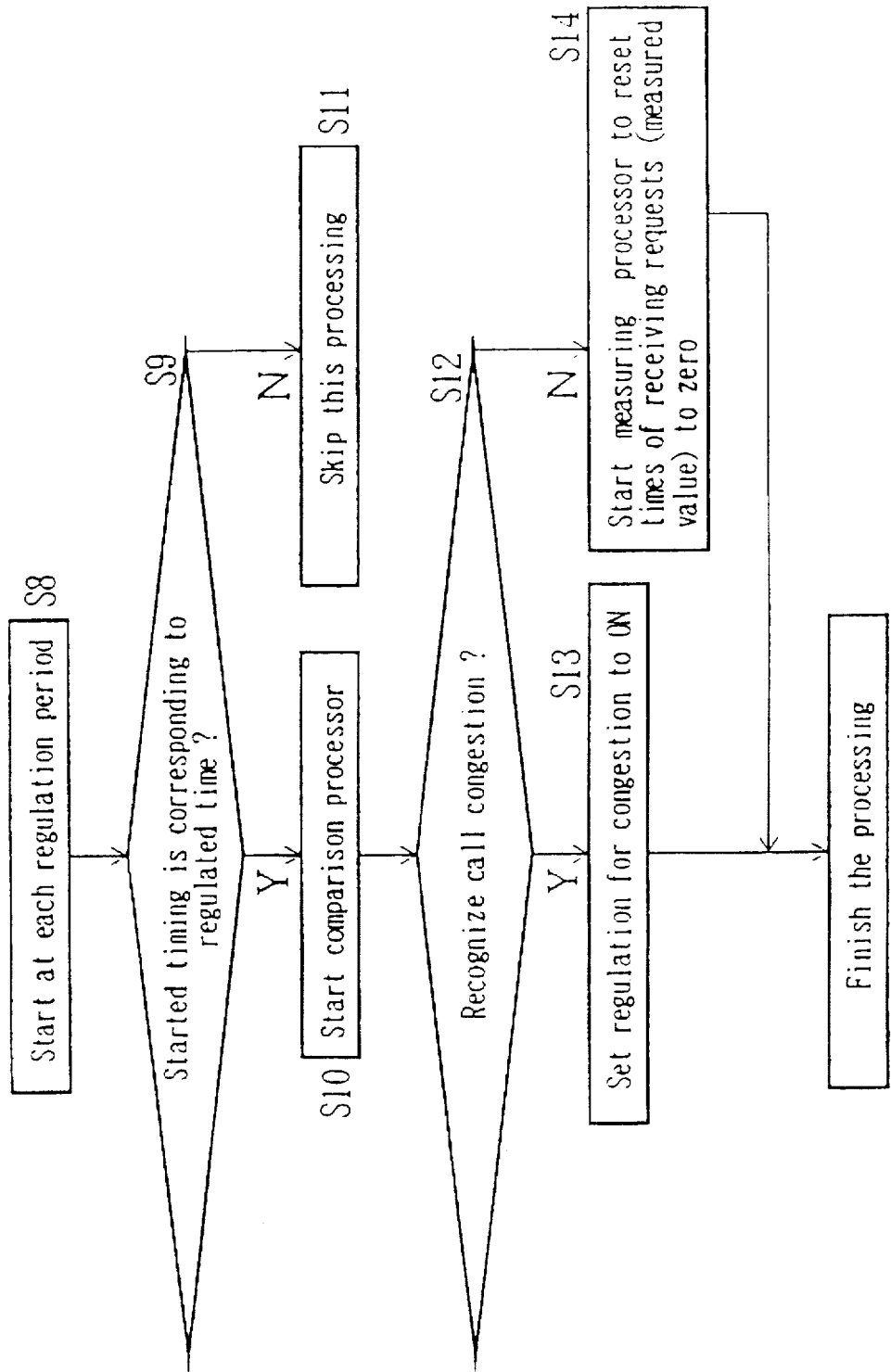
FIG. 7 is a flow chart (No. 1) illustrating an operation flow of a monitoring processor shown in FIG. 4.

The monitoring processor 827 starts at each regulation period that is stored in the regulation period memory 856 (STEP S8). FIG. 7 shows the first operation flow chart of the monitoring processor. It is judged by the monitoring processor 827 whether or not the started timing is corresponding to the regulated time (STEP S9).

If the timing is the regulated period, the above-described comparing processor 829 is started (STEP S10). It is judged whether or not the call congestion is recognized based on the result of comparison (STEP S12). If the call congestion is recognized, the regulation for call congestion is set to ON in the monitoring processor 827, and the processing is finished (STEP S13).

If the call congestion is not recognized, the times of receiving call set up requests stored in the memory 854 is reset to 0 per a regulated time (regulation period) which is prescribed by the setting processor 830 (STEP S14), and the processing is finished.

Figure 8:
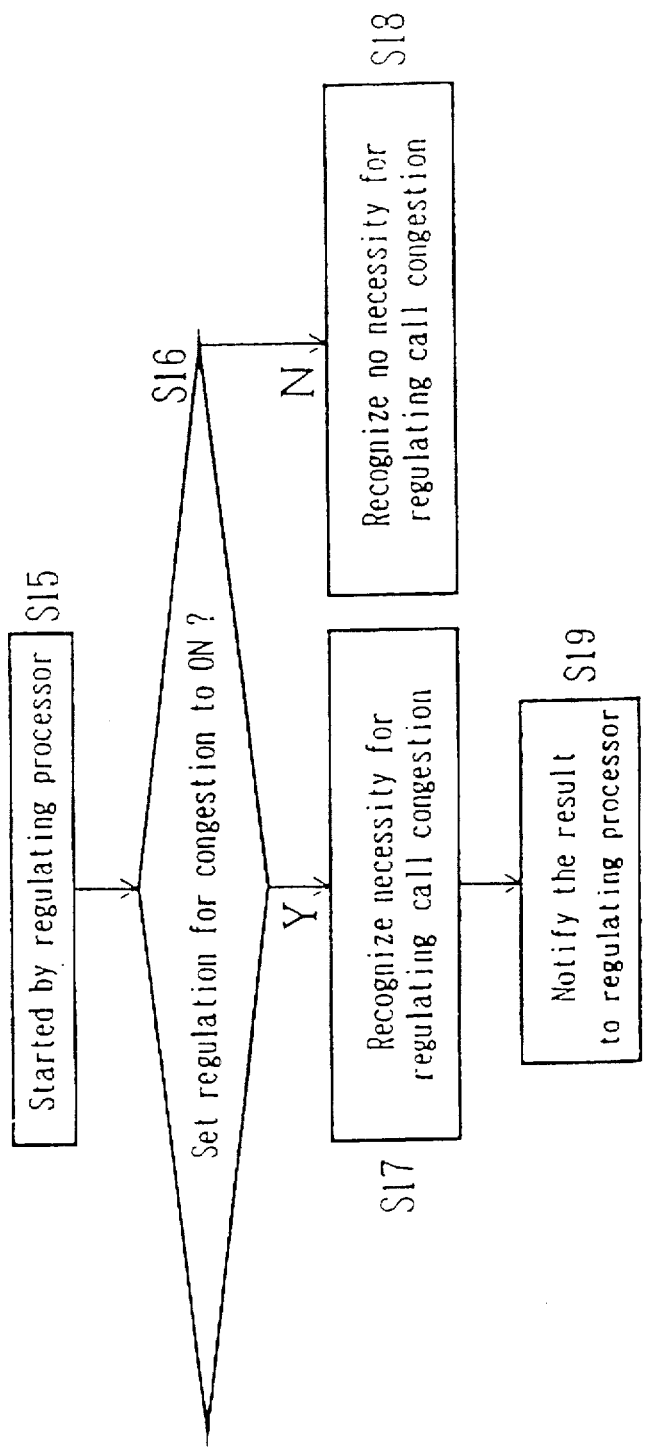
FIG. 8 is a flow chart (No. 2) illustrating an operation flow of a monitoring processor shown in FIG. 4.

Then, the regulating processor 826 starts the monitoring processor 827 (STEP S15). FIG. 8 shows the second operation flow chart of the monitoring processor 827. In the first processing chart, it is judged whether or not the regulation for call congestion is set to ON (STEP S16).

If the regulation for call congestion is set to ON, the necessity for regulating the call congestion is recognized, and the monitoring processor 827 instructs the regulating processor 826 to perform the regulation processing (STEP S17). If the regulation for call congestion is set to OFF, it is recognized that the regulation for the call congestion is not required (STEP S18), and the processor 827 notifies the information to the regulating processor 826 (STEP S19).

Figure 9:
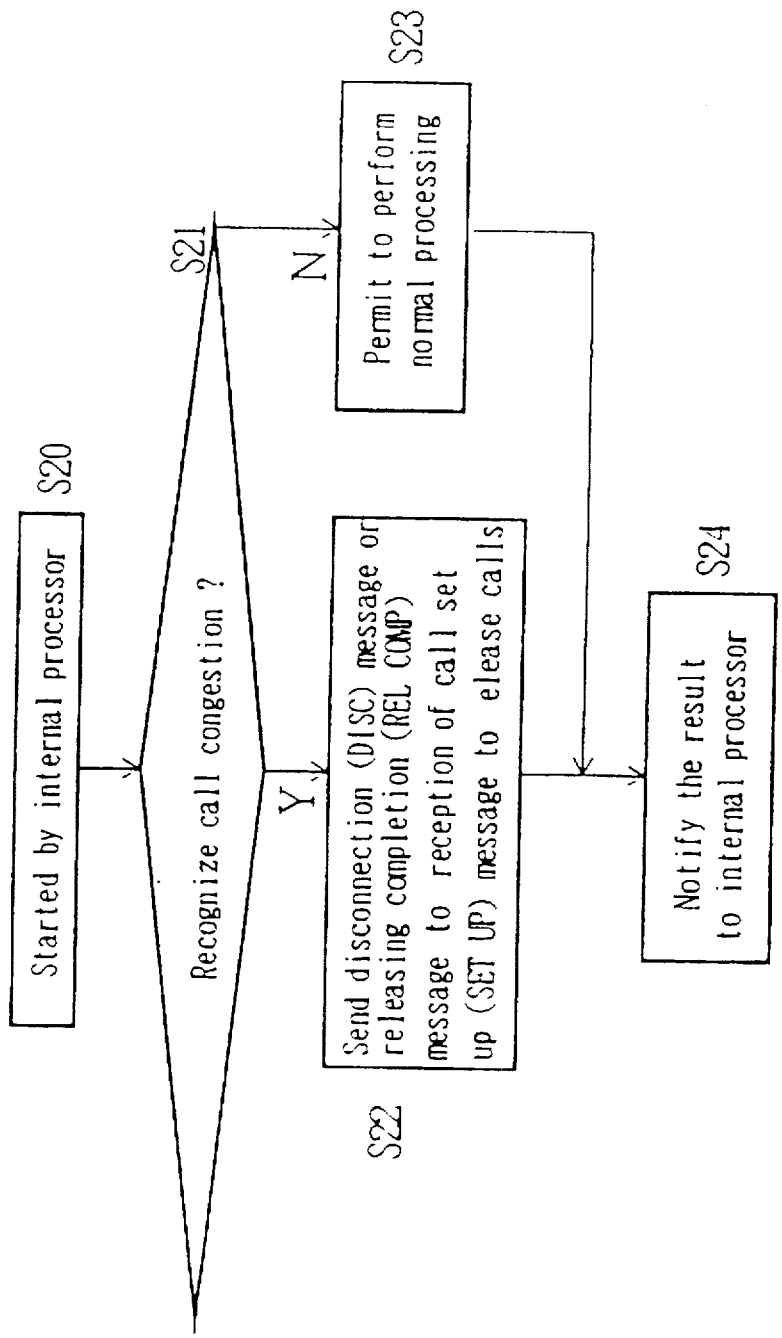
FIG. 9 is a flow chart illustrating an operation flow of a regulating processor shown in FIG. 4.

FIG. 9 shows a flow chart of flag processing of the regulating processor 826. The layer 3 processor 822 which is a part of internal processors starts the regulating processor 826. It is recognized whether or not the regulation for call congestion is required or not, i.e., it is recognized whether or not calls are congested (STEP S21).

If the call congestion is recognized, the regulating processor 826 sends a fixed equal disconnection (DISC) message or a releasing completion (REL COMP) message to the reception of call set up (SET UP) message through the output processor 825, releases the calls, and notifies the information to the layer 3 processor 822 (STEP S22).

If the call congestion is not recognized, the regulating processor 826 permits to perform the normal call processing (STEP S23) and notifies the information to the internal call processor 822 (STEP S24).

The condition of regulating congestion, i.e., the relationship between the communication processing and the busy call processing, is as follows;

The processing are performed in the order of the internal processing (communication processing), the internal processing (busy call processing), and the regulation for call congestion. If the value does not reach to the prescribed value, i.e., shortage of extension lines, the busy call processing is performed.

Figure 10:
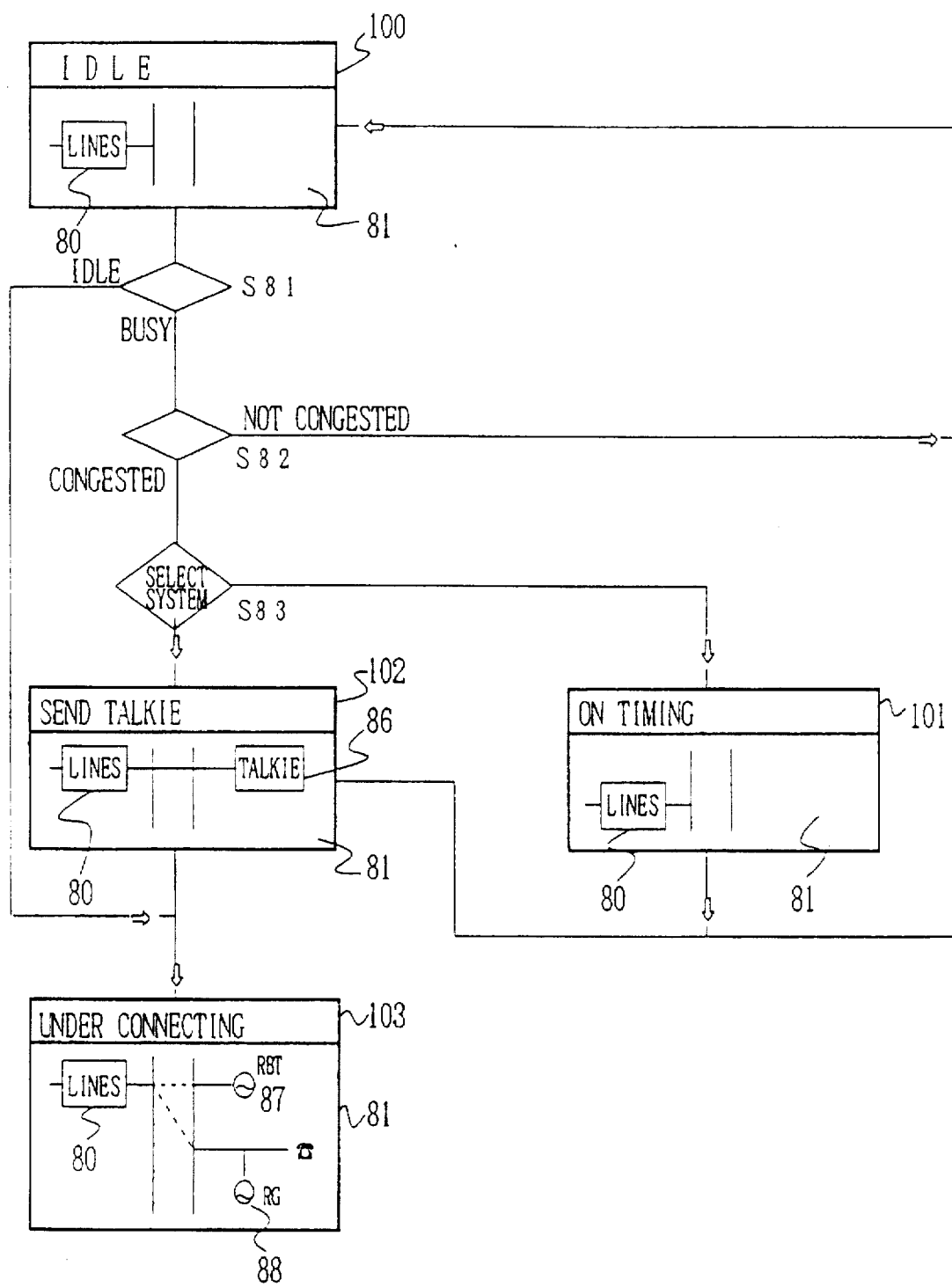
FIG. 10 is an explanatory diagram of an embodiment according to the present invention.

FIG. 10 is an explanatory diagram of the operation of the above-described embodiment according to the present invention, and it is an operation flow chart for explaining other embodiments according to the present invention.

Other embodiments according to the present invention will be briefly explained. When the monitoring processor 827 recognizes the call congestion, the processor 827 sends a disconnection (DISC) or a release completion (REL COMP) message after a prescribed timing (refer to FIGS. 2 and 3 as described above).

In the another embodiment, the processor 827 performs the connection for sending a talkie of a queue showing call congestion in the exchanger to urge call-senders for releasing calls. Talkie 86 is connected to the line controller 811, as shown in FIG. 4.

A more detailed explanation of other embodiments will be explained in accompany with FIG. 10. In FIG. 10, reference numerals 100 to 103 symbolically show an ISDN exchanger. In the structure shown in FIG. 4, the symbolic ISDN exchanger 100 shows the mode where the line controller 811 of network section 81 only performs the layer 2 processing for the lines 80.

If the calls are received from the lines 80, it is judged whether the lines are idle or busy (STEP S81). If the lines are idle, the line controller 811 connects to a ring back tone circuit 87 (refer to the structure of exchanger shown with a symbol 103 shown in FIG. 10), and ring back tones are sent to the senders of the calls to show under connecting the lines of senders.

If the lines are busy, it is judged whether or not the calls are congested (STEP S82). This judgment is performed in the processor 827 of the call controller 82, as described in FIG. 4.

If calls are congesting, the system proceeds to the prescribed status (STEP S83). In the above-described other embodiment, where the system is set so that the disconnection (DISC) or the release completion (REL COMP) message is sent after a prescribed timing, the processing of symbol 101 is performed.

The symbol 101 sends the disconnection (DISC) or the release completion (REL COMP) message after a prescribed timing. A prescribed timing for approximately 10 seconds corresponding to T. 310 of the ITU-T recommendation Q.931 (ISDN layer 3) is employed as the above-described prescribed timing. The regulating processor 826 sets this timing. The call releasing is thereby performed on the side of senders.

If the processing of symbol 102, which is another embodiment, is selected, a talkie 86 showing call congestion of the exchanger is provided. The system sends the disconnection (DISC) or the releasing completion (REL COMP) message as the message from the talkie 86, and urges senders to release calls.

Further, as other embodiment, if the call congestion is identified, the talkie 86 is connected for the reception of the call set up (SET UP) message in the symbol 102. In this case, the content of talkie 86 urges the sender to wait for a queue because of call congestion in the exchanger.

After the call congestion is canceled, the ring back tone 87 which shows under connecting the line of sender is sent (symbol 103). After sending the ringer 88 to the extension lines, the connection of extension lines is performed.

In the above-described explanation of the embodiment, the times of receiving call set up requests is employed as a prescribed value. However, the present invention is not limited to the set value, and it is possible to use a rate of using a call processor (central processor) or the response time of receiving the call set up message.

When employing the rate of using the call processor (central processor), the structure of apparatus is the same as shown in FIG. 4, i.e. the regulation is performed according to the load (the usage rate) per a unit time.

Figure 11:
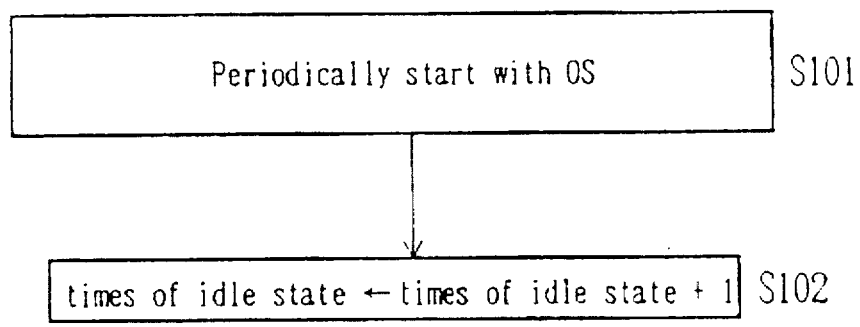
FIG. 11 is a flow chart illustrating an operation flow of the measuring processor when employing a using rate of a call processor, that is, central processor.
Figure 12:
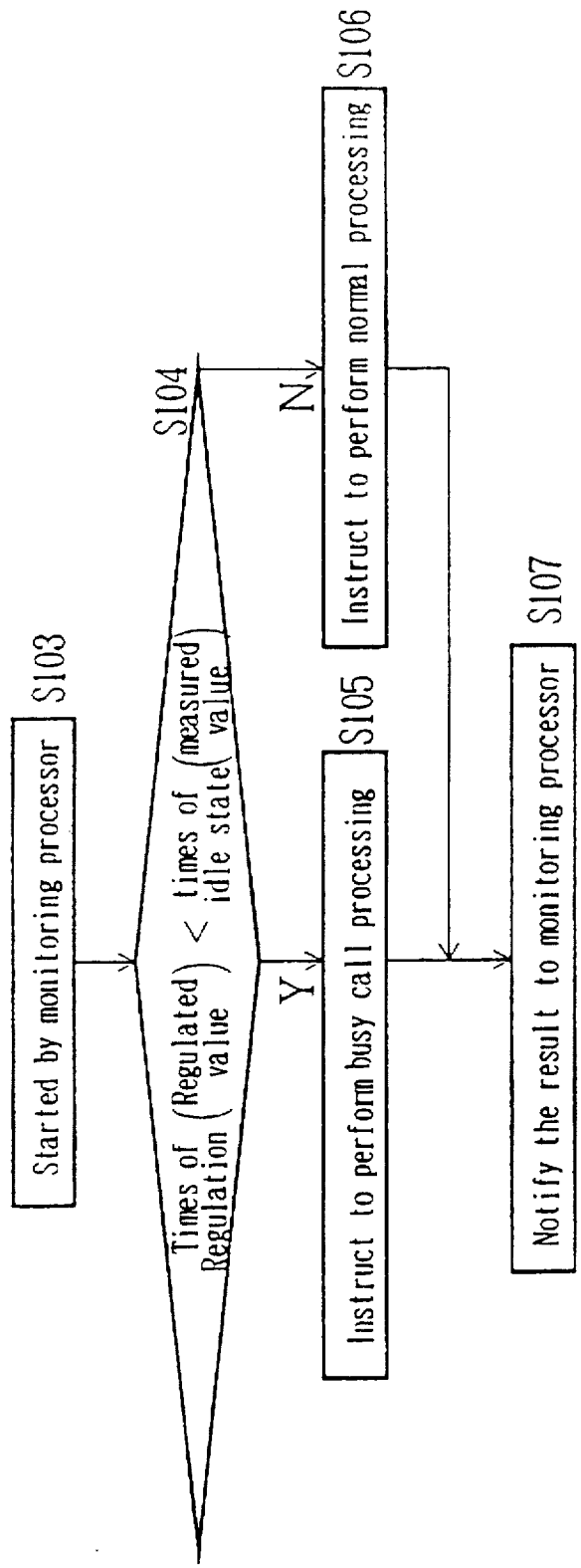
FIG. 12 is a flow chart illustrating an operation flow of the comparing processor when employing a using rate of the call processor.
Figure 13:
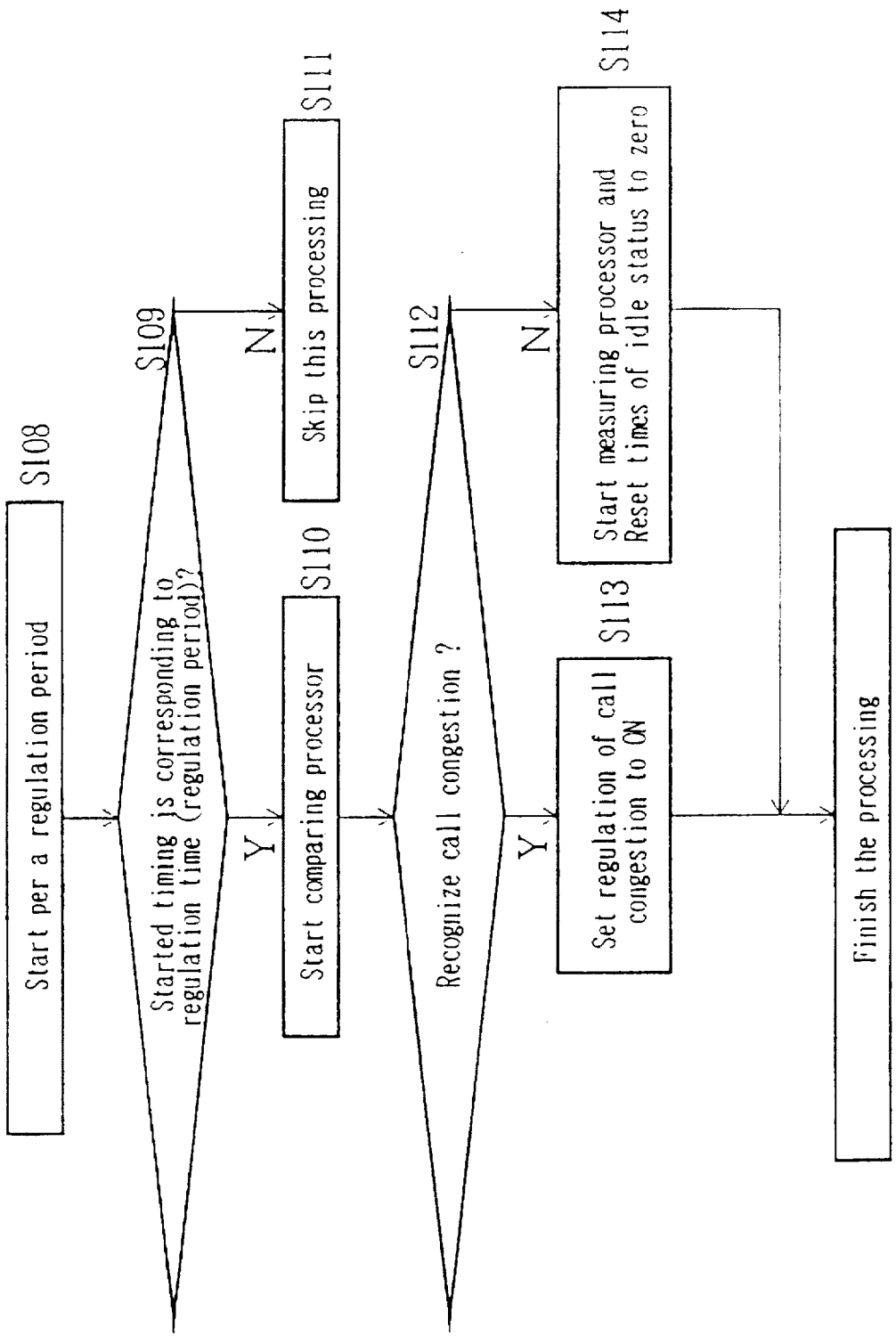
FIG. 13 is a flow chart illustrating an operation flow of the monitoring processor when employing a using rate of the call processor.

When employing the rate of using the call processor (central processor), the processing flow of the measuring processor, the processing flow of the comparing processor, and the processing flow of the monitoring processor are as shown in FIGS. 11 to 13.

In comparison with FIG. 5, the measuring processor 828 periodically starts with OS (Operating System) (STEP S101).

Then, the measuring processor 828 adds one to times of idle status, and stores it to the memory 854 in the memory 85 (STEP S102).

FIG. 12 illustrates the operation flow chart of the comparing processor 829 when employing the rate of using the call processor (central processor).

The system operator starts the comparing processor 829 with the monitoring processor which can monitor, not shown in the diagram (STEP S103). After starting the monitoring processor, the comparing processor 829 compares the regulated value which is stored in the memory 855 of the memory 85 in advance and the measured value of time of idle status which is added by the measuring processor 828, as described above, and is stored in the memory 854 (STEP S104).

As the result of this comparison, when the measured value of idle status is less than the regulated value, the comparing processor 829 instructs the regulating processor 826 to perform the busy call processing (STEP S105). When the measured value is more than the regulated value, the processor 829 instructs the processor 826 to perform the normal processing (STEP S106).

In the both cases, the result of processing is reported to the above-described monitoring processor (STEP S107). Therefore, the system operator can monitor the call congestion status.

Further, the monitoring processor 827 starts per a regulation period which is stored in the memory 856 (STEP S108). FIG. 13 shows the operation flow chart of the monitoring processor 827, and it is judged whether or not the started timing is corresponding to a regulation period (STEP S109).

When the timing is the regulation period, the processor 827 starts the above-described comparing processor 829 (STEP S110), and judges whether or not the call congestion is recognized according to the result of the comparison (STEP S112). If the call congestion is recognized, the call congestion regulation is set to ON in the monitoring processor 827, and the processing is finished (STEP S113).

Meanwhile, when the call congestion is not recognized, the times of idle status stored in the memory 854 per a regulation time (regulation period) which is prescribed by the setting processor 830 is reset to zero (STEP S114), and the processing is finished. Further, the operation flow in the regulating processor 826 is the same as shown in FIG. 9.

Figure 14:
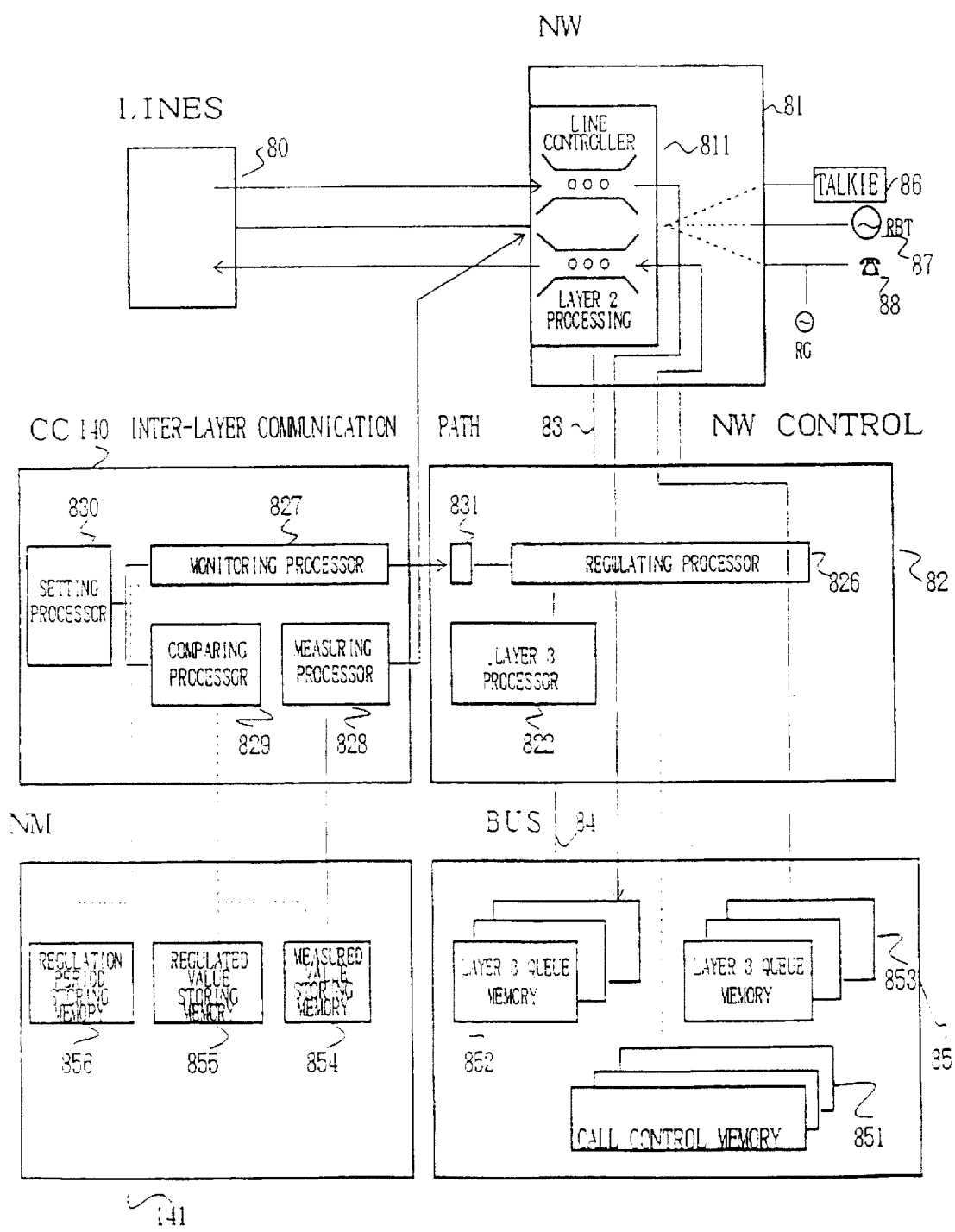
FIG. 14 is a block diagram of an embodiment according to the present invention using response time for receiving a call set up reception message.

The structure of the apparatus when employing the response time for receiving the call set up accepted message is as shown in FIG. 14. An external monitor measures the processing time of receiving calls and monitors the call congestion.

In FIG. 14, an external controller (CC) 140 is connected to a memory (MM) 141 with a bus.

Reference numeral 831 is a flag monitor. The regulation processing is executed in the regulating processor 826 according to the result of monitoring of the flag monitor 831. Other structure is the same as explained in FIG. 4.

An operation flow of measuring processor, an operation flow of comparing processor and an operation flow of monitoring processor will be explained in accompanying with FIGS. 15 through 18.

Figure 15:
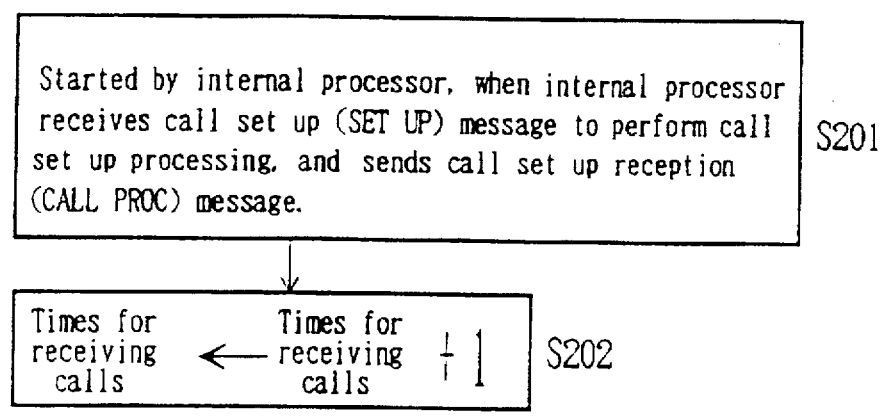
FIG. 15 is a flow chart illustrating an operation flow of the measuring processor when employing a response time for receiving a call set up accepted message.

In FIG. 15, the measuring processor 828 measures the interval from sending calls of lines [sending call set up (SET UP) message] till accepting calls of lines [receiving call set up accepted (CALL PROC) message] (STEP S201).

Then, the measuring processor 828 replaces the previous response time to the current call reception time, and stores it to the memory 854 of the memory 85 (STEP S202).

Figure 16:
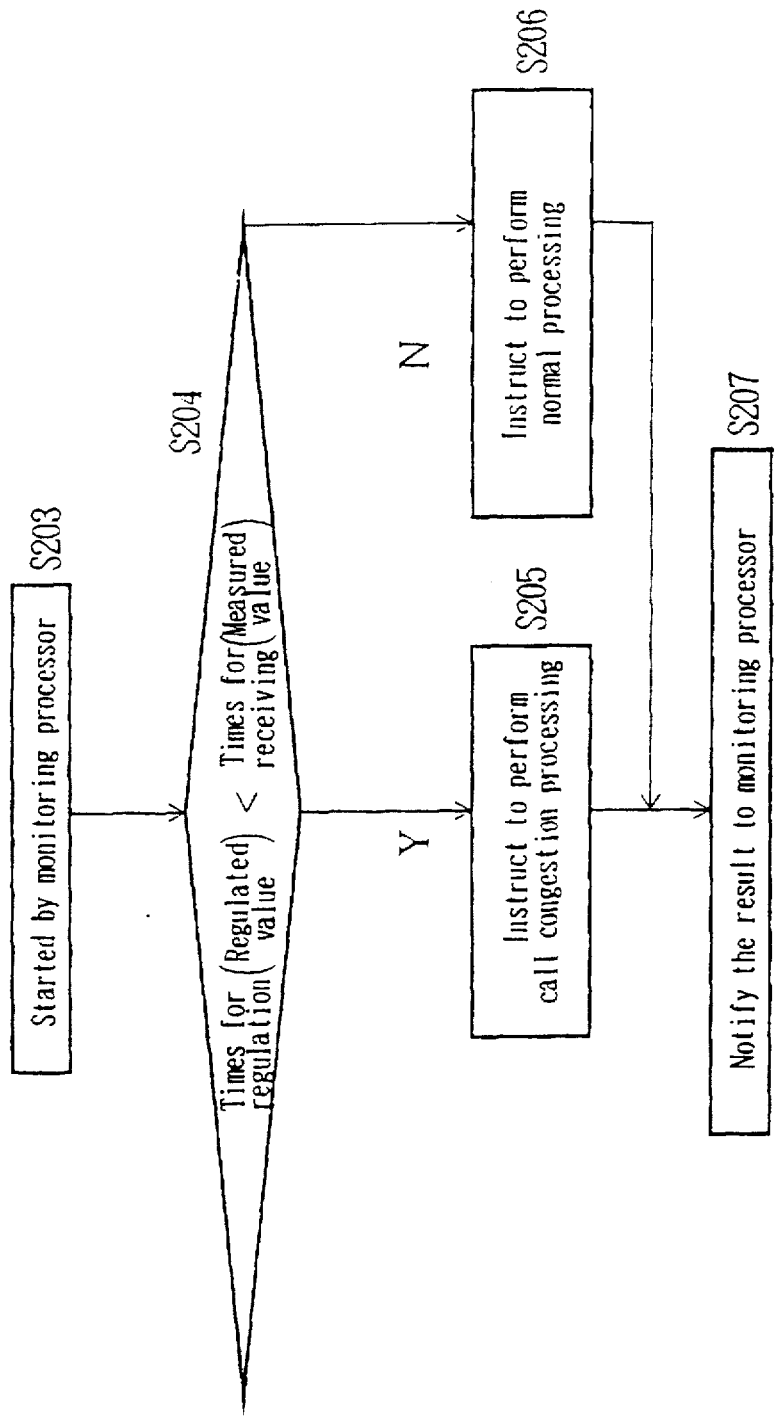
FIG. 16 is a flow chart illustrating an operation flow of the comparing processor when employing a response time for receiving a call set up accepted message.
Figure 17:
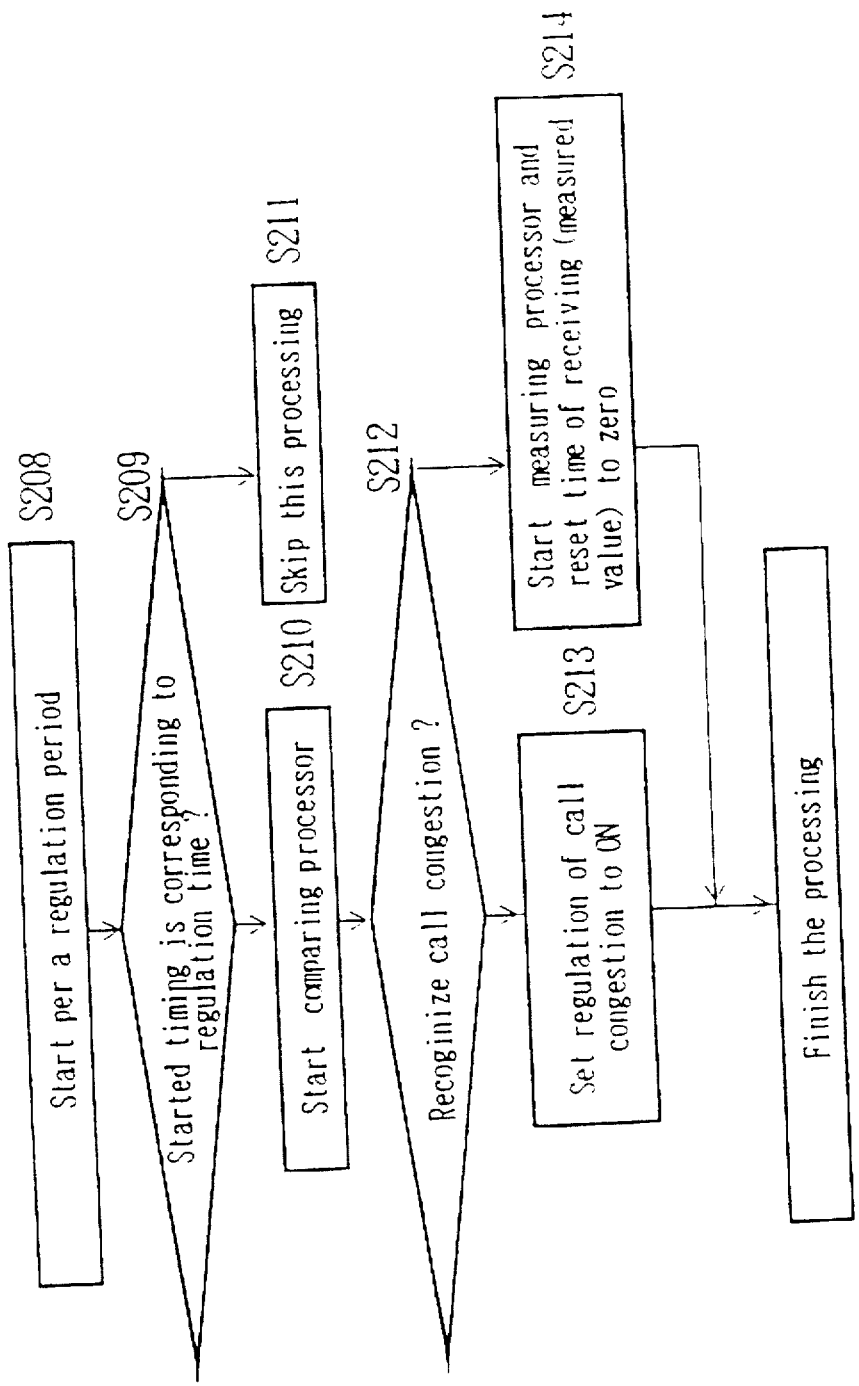
FIG. 17 is a flow chart (No. 1) illustrating an operation flow of the monitoring processor when employing a response time for receiving a call set up accepted message.

FIG. 16 illustrates an operation flow chart in the comparing processor 829. The system operator starts the comparing processor 829 by the monitoring processor which can be monitored, not shown in the diagram (STEP S203). The comparing processor 829 compares the regulated reception response time which is a regulated value stored in the memory 855 of the memory 85 in advance with the measured reception response time measured in the above-described measuring processor 828 and stored in the memory 854 (STEP S204).

As the result of this comparison, when the measured value is more than the regulated value, the comparing processor 829 instructs the regulating processor 826 to perform the call congestion processing (STEP S205). When the measured value is less than the regulated value, the processor 829 instructs the processor 826 to perform the normal processing (STEP S206).

In both cases, the result of processing is reported to the above-described monitoring processor (STEP S207). Therefore, the system operator can monitor the status of call congestion.

The monitoring processor 827 starts per a regulation period which is stored in the memory 856 for storing the regulation period (STEP S208). It is judged whether or not the started timing is corresponding to the regulation time (STEP S209).

If the timing is corresponding to the regulation period, the monitoring processor 827 starts the above-described processor 829 (STEP S210), and it is judged whether or not the call congestion is recognized according to the result of comparison (STEP S212). If the call congestion is recognized, the processor 827 sets the regulation for call congestion to ON, and the processing is finished (STEP S213).

Meanwhile, when the call congestion is not recognized, the processor 827 resets the call reception response time stored in the memory 854 for storing the measured value per a regulation time (regulation period) which is prescribed by the setting processor 830 to zero (STEP S214), and the processing is finished.

Figure 18:
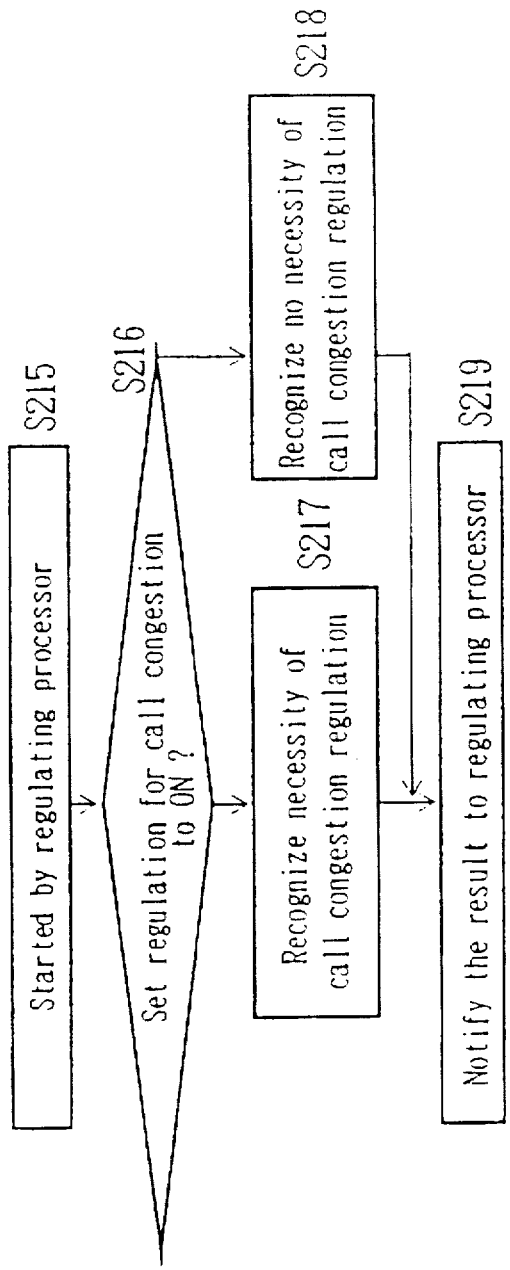
FIG. 18 is a flow chart (No. 2) illustrating an operation flow of the monitoring processor when employing a response time for receiving a call set up accepted message.
Figure 19:
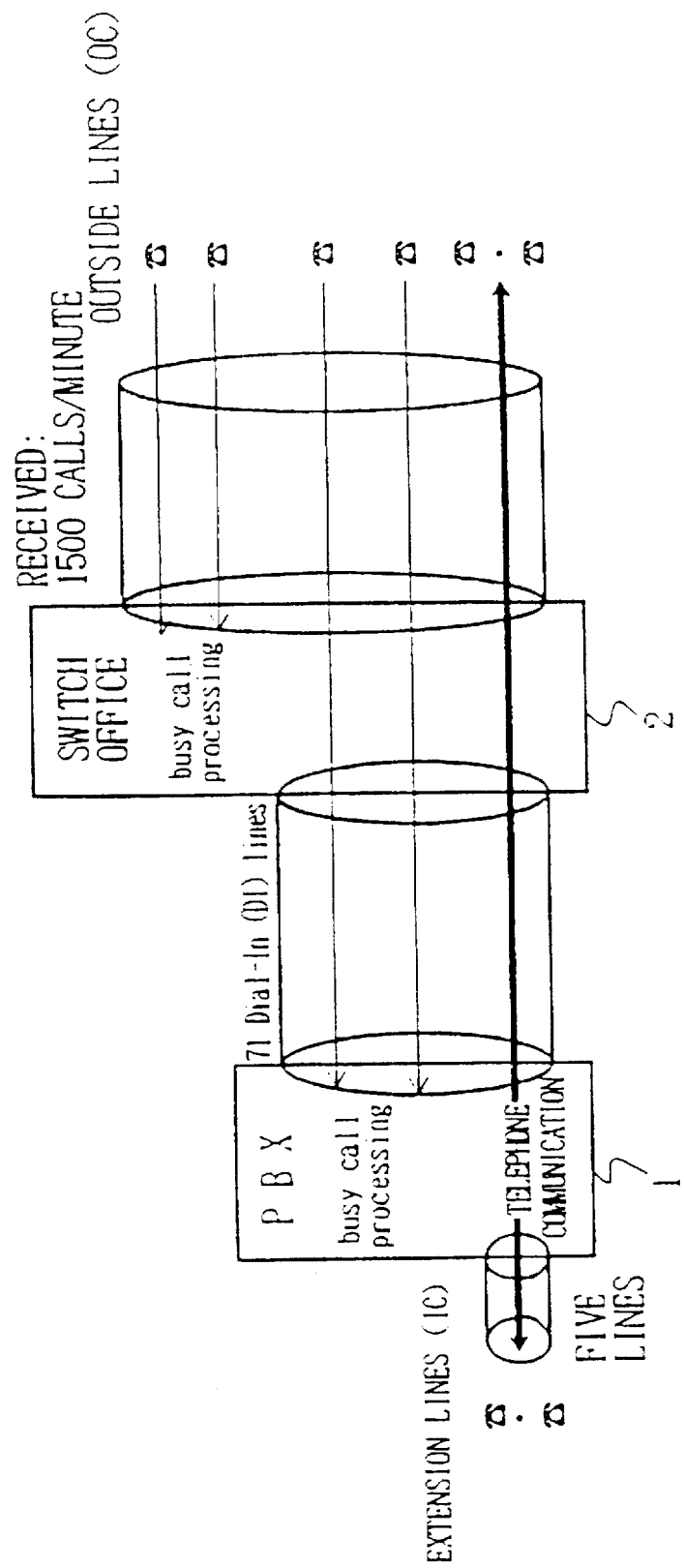
FIG. 19 is a diagram for explaining a problem when connecting a PBX to an office switch.
Figure 20:
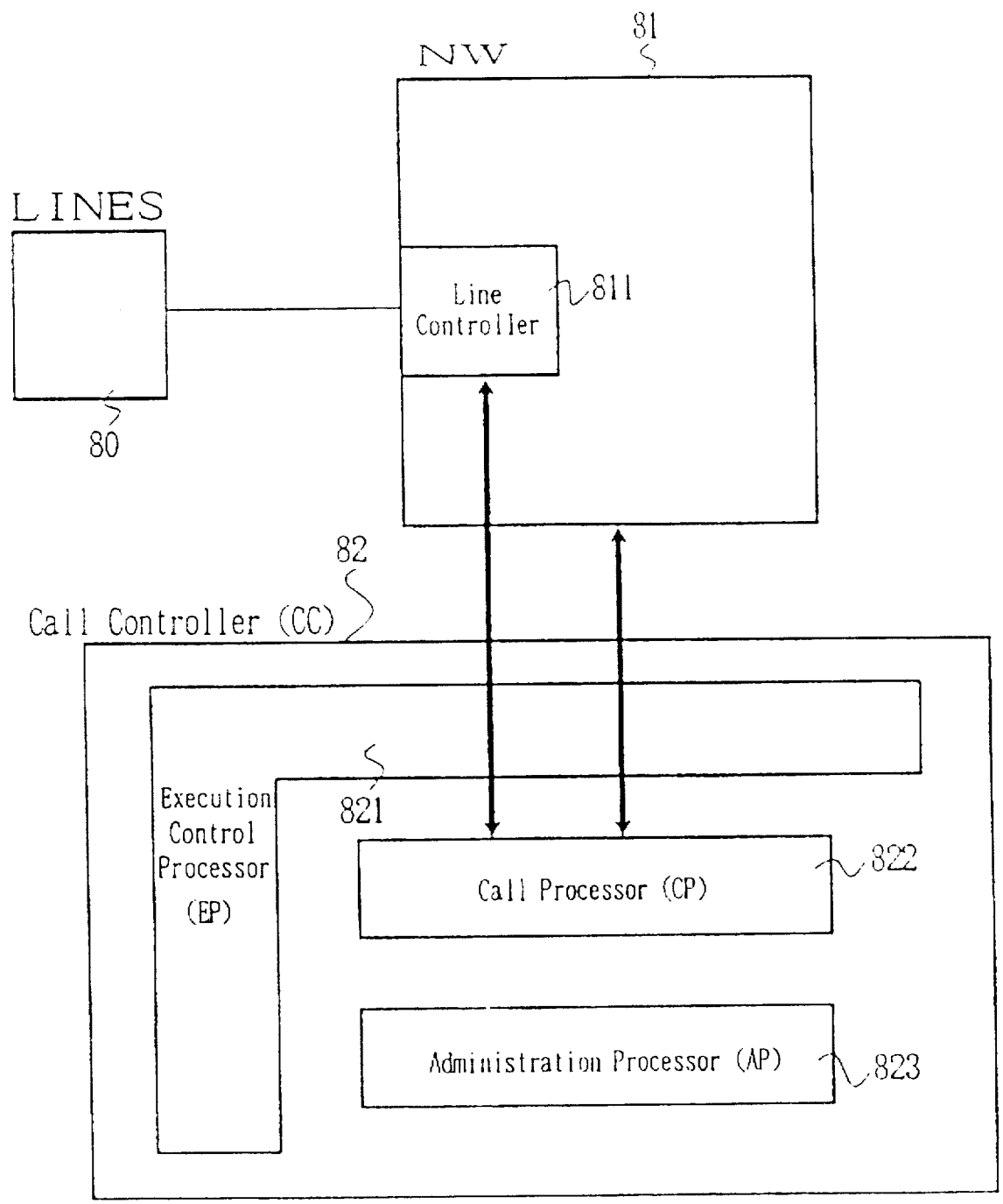
FIG. 20 is a diagram showing a general structural example of a PBX.

Then, the regulating processor 826 starts the monitoring processor 827 (STEP S215). FIG. 18 shows the second operation flow chart of monitoring processor 827. It is judged whether or not the regulation for call congestion is set to ON in the above-described operation flow (STEP S216).

When the regulation for call congestion is set to ON, the monitoring processor 827 recognizes that the regulation for call congestion is required, and instructs the regulating processor 826 to perform the regulation processing (STEP S217). When the regulation for call congestion is set to OFF, the processor 827 recognizes that the regulation for call congestion is not required (STEP S218), and sends the regulation signal (STEP S219). Further, the processing in the regulating processor 826 is the same as shown in FIG. 9.

As explained according to the above-described embodiments, the present invention can improve to regulate the call reception in the layer 2 processing. Accordingly, it makes easy to control the regulation without sending any new messages in layer 3.

Further, the present invention can improve to remove inconvenience such as the call is disconnected in the layer 3 processing with disconnecting the layer 2, when call congestion.

The invention may be embodied in other specific forms without departing from the spirit or essential characteristic thereof. The present embodiment is therefore to consider in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An ISDN switch for regulating call congestion comprising:

a line controller for receiving a queue of call set up requests; and a call control section for receiving sequentially the call set up requests from the line controller including;

a call processing means for performing call processing for received call set up requests in an ISDN system as internal processing, a regulating means provided at an output of the call processing means for judging whether or not a status of receiving the call set up requests exceeds a prescribed value, and regulating the call set up requests, without performing the internal processing by said call processing means when the status of receiving the call set up requests exceeds the prescribed value; and wherein said call control section is provided for a layer 3 of an ISDN protocol.

2. The ISDN switch according to claim 1, wherein the prescribed value is a predetermined value corresponding to the number of received call set up requests, and the regulating means regulates the call set up requests when the number of the received call set up requests exceeds the prescribed value.

3. The ISDN switch according to claim 1, wherein the prescribed value is a usage rate of the call processing means, and the regulating means regulates the call set up requests when the usage rate of the call processing means exceeds the prescribed value.

4. The ISDN switch according to claim 1, wherein the prescribed value is a queue length of the call set up requests, and the regulating means regulates the call set up requests when the queue length of the call set up requests exceeds the prescribed queue length.

5. An ISDN switch for regulating call congestion comprising:

a line controller for receiving a queue of call set up requests;

memory; and a call control section for receiving sequentially the call set up requests from the line controller, including a call processor for receiving call set up requests via the line controller and performing call processing for received call set up requests as internal processing, first means for regulating calls, second means for setting a prescribed value for regulating call reception in the memory, third means for measuring a status of receiving call set up requests sent from the line controller, fourth means for comparing the prescribed value set in the memory by the second means with the status of receiving call set up requests measured in the third means, and fifth means for monitoring whether or not the calls are congesting according to the result of comparison of the fourth means, and controlling the first means to request the connection or releasing of calls to senders to regulate receiving the call set up requests when the calls are congested.

6. The ISDN switch according to claim 5, wherein the second means sets and stores a regulation period in the memory, and the fifth means reads an output of the fourth means with timing of the regulation period and sends regulation processing control signals to the first means.

7. An ISDN switch according to claim 5, wherein a talkie is connected to the line controller, and information showing call congestion in the ISDN switch is sent to a sender by the talkie when receiving a call set up request during call congestion.

8. In an ISDN exchanger, a method for regulating call congestion comprising the steps of:

sequentially receiving a queue of call set up requests;

performing call processing for received call set up requests in an ISDN system as internal processing;

judging whether or not a status of the received call set up requests exceeds a prescribed value; and regulating the call set up requests, without performing the internal processing when the status of received call set up requests exceeds the prescribed value; and where said judging and regulating steps are executed for a layer 3 of an ISDN protocol.

9. The method for regulating call congestion according to claim 8, wherein the prescribed value is a predetermined value corresponding to the number of received call set up requests, and in the step of judging, the call set up requests are regulated when the number of the received call set up requests exceeds the prescribed value.

10. The method for regulating call congestion according to claim 8, wherein the prescribed value is a performing rate of call processing for the received call set up requests, and in the step of regulating the call set up requests, the call set up requests are regulated when the rate of performing call processing for the received call set up requests exceeds the prescribe value.

11. The method for regulating call congestion according to claim 8, wherein the prescribed value is a queue length of the received call set up requests, and in the step of regulating the call set up requests, the call set up requests are regulated when the number of received call set up requests exceeds the prescribed value.

* * * * *